United States Patent [19]
Adler

[11] Patent Number: 5,669,265
[45] Date of Patent: Sep. 23, 1997

[54] ARRANGEMENT FOR GEAR CHANGE OPERATION

[75] Inventor: Horst Adler, Vagnhärad, Sweden

[73] Assignee: Scania CV AB, Sweden

[21] Appl. No.: 636,922

[22] Filed: Apr. 24, 1996

[30] Foreign Application Priority Data

Apr. 26, 1995 [SE] Sweden ................. 9501536

[51] Int. Cl.$^6$ ................................. F16H 59/00
[52] U.S. Cl. ................. 74/335; 92/52; 251/62
[58] Field of Search .............. 74/335, 336, 473 R; 251/62; 92/52

[56] References Cited

U.S. PATENT DOCUMENTS

| | | | |
|---|---|---|---|
| 1,430,359 | 9/1922 | Canion | 92/52 |
| 2,828,642 | 4/1958 | Bernard | 74/336.5 |
| 3,885,458 | 5/1975 | Wright | 92/52 |
| 4,593,606 | 6/1986 | Klatt et al. | 92/52 |
| 5,061,078 | 10/1991 | Yada | 92/52 X |
| 5,487,527 | 1/1996 | Eggleston | 251/62 |
| 5,507,197 | 4/1996 | Devaud et al. | 74/335 |

*Primary Examiner*—Charles A. Marmor
*Assistant Examiner*—Peter T. Kwon

*Attorney, Agent, or Firm*—Ostrolenk, Faber, Gerb & Soffen, LLP

[57] ABSTRACT

An apparatus for operating a device, e.g. through moving a piston rod. An outer cylinder has an inner cylinder movable between the end walls of the outer cylinder, whereby the inner cylinder is a piston movable in the outer cylinder. An inner piston in the inner cylinder is movable between the end walls of the inner cylinder. First and second fluid flow ducts communicate through the ends of the outer cylinder outside the inner cylinder. Third and fourth fluid flow passages communicate between the outer cylinder and the inner cylinder at the opposite respective sides of the inner piston in the inner cylinder, such that application of gas under pressure to one or the other of the first and second ducts causes movement first of the outer piston in the outer cylinder and then of the inner piston in the inner cylinder for moving the piston rod connected with the inner piston. Details of an embodiment of this staged movement cylinder piston arrangement are disclosed. The third and fourth passages are shaped for slower flow than the first and second ducts, so that movement of the inner piston and its rod can be in stages, the first stage rapid and the second stage slow and more controlled. The apparatus is particularly useful for shifting an operating device such as a gear change shaft to a gear box.

19 Claims, 2 Drawing Sheets

ARRANGEMENT FOR GEAR CHANGE OPERATION

BACKGROUND OF THE INVENTION

The present invention relates to an arrangement for shifting a piston in stages, particularly, for example, a piston used in a gear change operation in a motor vehicle.

STATE OF THE ART

Gear changing in a multi-speed synchronized vehicle gearbox for a heavy-duty vehicle is usually done by means of servo devices. The driver executes or initiates a gear change by switching or shifting a control device, while servo devices effect the gear change by means of operating devices which may constitute or be in a motion-transmitting connection with a gearchange shaft to a synchronizing system in the gearbox. This operation of the gearchange shaft for engagement and disengagement of a gear thus takes place in practice by means of a servo device in the form of a compressed air cylinder. In such cases, gear engagement involves the application of a high pressure to the cylinder piston, thereby rapidly shifting the gearchange shaft to its synchronizing position, whereby the shift movement ceases while the synchronization takes place. During this time there is a further build-up of air pressure in the cylinder, which means that when the synchronizing process is complete the piston can with great force rapidly continue and complete the gearchange shaft shift so as to complete the gear change. This known technique does, however, involve disadvantages and inconveniences, e.g. the rapid movement of the piston which thus takes place when the piston is being acted upon by a large force makes the piston reaching its extreme position strike the cylinder endwall and thereby cause disturbing noise.

SUMMARY OF THE INVENTION

One object of the invention is to provide a new type of piston-and-cylinder arrangement whereby the aforesaid disadvantage is effectively obviated by the gearchange movement taking the form of a damped multi-stage shift. The basic idea of the invention in this respect is to use a so-called two-stage cylinder instead of a single-acting cylinder as has been used according to the known technique. Two-stage cylinder in this context means a piston-and-cylinder arrangement with two coaxial interacting piston units having a common piston rod which moves in two stages in each direction (i.e. outwards from and inwards into the arrangement), i.e. a total of four stages of movement. In each direction of movement it is also required that the first stage of movement should take place rapidly, while the second stage of movement should take place slowly.

A further object with the invention applied to an advantageous embodiment is to provide a piston-and-cylinder arrangement whereby the "dead" volumes at the respective extreme positions of movement of the two piston units are reduced to an absolute minimum.

DESCRIPTION OF THE INVENTION

The objects mentioned are achieved according to the invention by the fact that the arrangement exhibits the features indicated in the characterizing part of patent claim 1.

An arrangement according to the invention includes an outer cylinder block and a first piston-and-cylinder package which is arranged for movement within this outer cylinder block and which constitutes the first piston unit in the arrangement. This first piston-and-cylinder package comprises an inner cylinder and a second piston which is arranged for movement in this inner cylinder and which constitutes the second piston unit in the arrangement. The inner cylinder thus constitutes a piston part which is movable in the outer cylinder block. The second piston movable in the inner cylinder is fastened to one end of a piston rod common to both piston units which protrudes from the piston-and-cylinder arrangement via an aperture through one endwall of the inner cylinder and an aperture (coaxial with that aperture) through the adjacent endwall of the outer cylinder block. The outer cylinder block is provided with pressure fluid connections for driving the entire piston-and-cylinder arrangement. In practice it is perhaps most advantageous to use a gas as the pressure fluid, in which case compressed air is a practical choice on heavy-duty vehicles which have compressed air available from their brake system.

The pressure fluid connections of the outer cylinder block, which may therefore in practice be compressed air connections, include at least one fluid duct which communicates with each end of the piston-and-cylinder package containing the cylinder space in the cylinder block. By means of these fluid ducts the relevant pressure fluid may be supplied to or removed from the respective end of the cylinder space in order to cause movement of the piston-and-cylinder package within the cylinder space of the outer cylinder block. The inner cylinder in its turn has each of its two endwalls pierced by at least one fluid flow passage communicating with the cylinder space in the inner cylinder. Via these flow passages through the two end walls of the inner cylinder, the relevant pressure fluid may be made to flow into or out of the cylinder space of the inner cylinder on each side of the piston movable therein, in order to cause movement of the latter in the inner cylinder.

The arrangement according to the invention may also exhibit the further features indicated by the dependent claims 2-6.

To achieve the special movement characteristics required to distinguish an arrangement according to the invention, i.e. rapid shift movement in the first stage of movement and slow in the second, it is advantageous that the fluid flow passages through the two endwalls of the inner cylinder have smaller minimum flow cross-sectional areas than the fluid ducts or pressure fluid connections of the outer cylinder block. Dimensioning the flow passages of the inner cylinder in this manner makes it possible to achieve their functioning as constricted ducts as compared with the fluid ducts or fluid connections of the outer cylinder block. These constricted passages through the endwalls of the inner cylinder allow the relevant pressure fluid to flow between the cylinder space of the outer cylinder block and the cylinder space inside the inner cylinder. In order as far as possible to eliminate or at least reduce to a minimum the "dead" volumes adjacent to the end surfaces of the two piston units of the arrangement at their respective extreme positions, it may be advantageous that the cylinder space in the outer block be bounded at its ends by mutually parallel plane endwall surfaces, with the inner cylinder exhibiting external end surfaces parallel to these endwall surfaces. This makes good surface contact possible between the respective end surface of the inner cylinder and the adjacent endwall surface of the surrounding cylinder space. At the periphery of each endwall surface in the cylinder space of the outer cylinder block there may also be a circumferential groove communicating with the orifice to the fluid duct at the respective end of the cylinder 5 space.

To help to reduce the above mentioned "dead" volumes, the cylinder space in the inner cylinder may also be bounded at its ends by mutually parallel plane endwall surfaces which are perpendicular to the longitudinal direction of the piston rod, with the piston in the inner cylinder exhibiting external end surface areas parallel with these endwall surfaces, at least in the radially outer region of the piston. This makes good surface contact between the endwall surface of the cylinder space and the end surface region of the piston possible at the two extreme positions of the piston in the cylinder space.

To provide effective piston seals (in the respective cylinder spaces) for the two piston units of the arrangement, it may be advantageous that the outer cylinder block be provided with a ring seal sealing with respect to the outside of the shell wall of the inner cylinder, in addition to which it may be advantageous that the piston inside the inner cylinder have its periphery provided with a circumferential piston seal arranged in a circumferential groove in the shell surface of the piston. The ring seal of the outer cylinder block may for example be placed in a circumferential groove in the shell wall of the cylinder space.

Other features and advantages of the present invention will become apparent from the following description of the invention which refers to the accompanying drawings.

BRIEF DESCRIPTION OF THE DRAWING(S)

The invention will now be described and explained further below with reference to the attached drawings which show axial longitudinal sections through not only a purely theoretical idealized embodiment of the arrangement according to the invention but also a practical embodiment of an arrangement according to the invention, as follows:

FIG. 1 shows similar axial longitudinal sections through an idealized schematic embodiment of an arrangement according to the invention, with each of the five subfigures 1a–1e depicting the arrangement with its two piston units at various combinations of extreme positions; and FIG. 2 shows in side view (and partly in axial longitudinal section) a specific embodiment of an arrangement according to the invention connected for operating a gearchange shaft belonging to a synchronized gearbox.

DETAILED DESCRIPTION OF THE INVENTION

Figure 1:
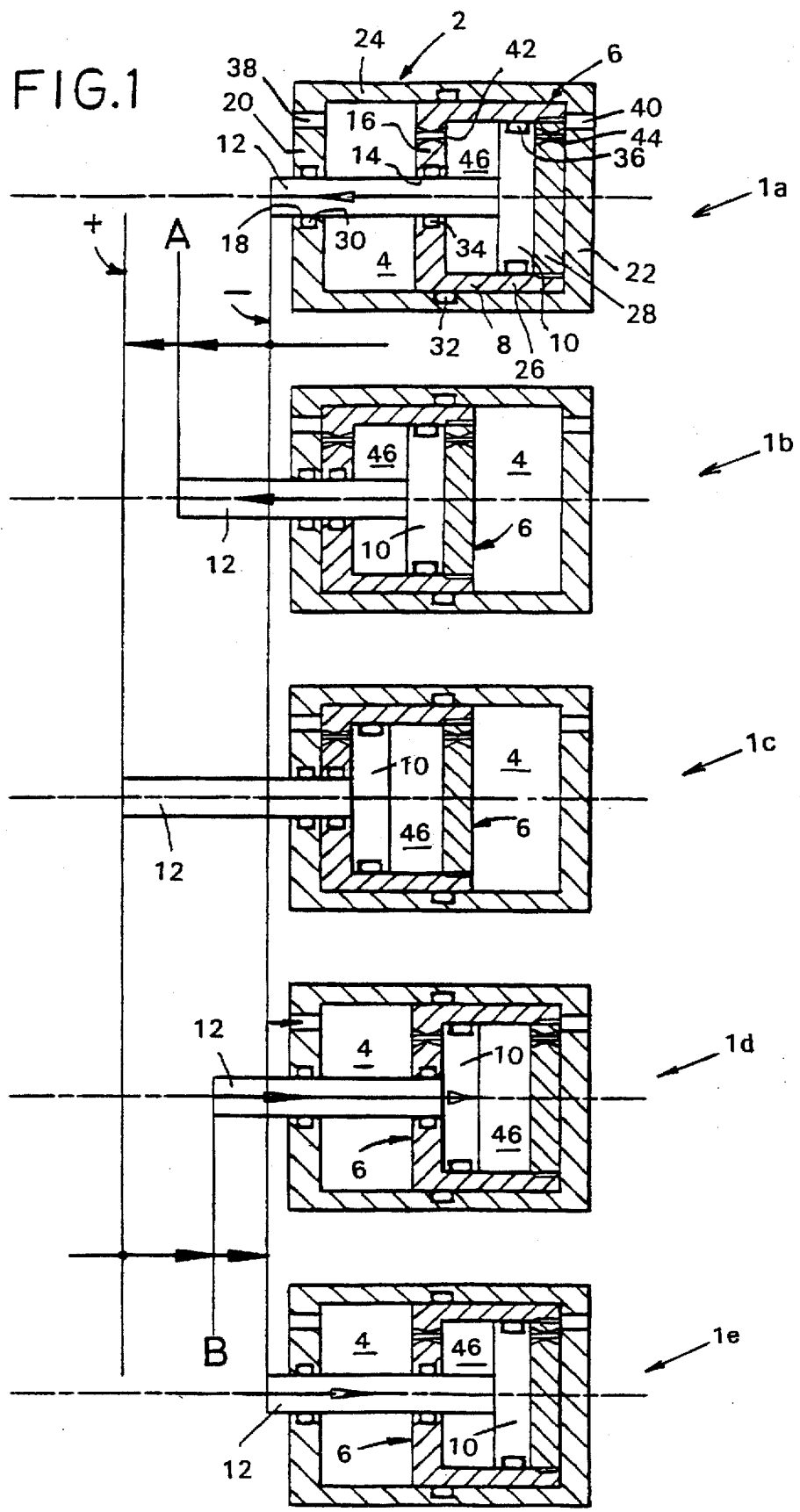

The piston-and-cylinder arrangement depicted in FIG. 1 is intended for multi-stage shifting of an operating device such as a gearchange shaft to a synchronized gearbox (not depicted in these figures) in the form of planetary gearing.

The arrangement according to FIG. 1 thus includes an outer cylinder block 2 containing a cylinder space 4 which has a piston-and-cylinder package 6 arranged for axial movement inside it and constituting a first movable piston unit in the arrangement. This piston-and cylinder package 6 includes an inner cylinder 8 movable as a cylindrical piston part inside the cylinder block 2, and a piston 10 arranged for movement in this inner cylinder.

The piston 10 constitutes a second piston unit in the arrangement and is fastened to one end of a piston rod 12 which protrudes from the piston-and-cylinder arrangement via not only a central aperture 14 in one endwall 16 of the inner cylinder 8 but also an aperture 18 (coaxial with the aperture 14) in one end wall 20 of the outer cylinder block 2. The outer cylinder block 2 has at its opposite end a second endwall 22, and the endwalls 20, 22 are connected together by the shell wall 24 of the cylinder block 2. The inner cylinder 8 includes not only the endwall 16 but also a shell wall 26 and a second endwall 28 which is inserted in the opposite end of the cylinder to the endwall 16.

The piston-and-cylinder arrangement conventionally incorporates annular seals 30, 32, 34 and 36 which seal between mutually movable parts of the arrangement.

The endwall 20 of the outer cylinder block 2 is pierced by a short fluid duct or aperture 38 and there is in the opposite endwall 22 of the cylinder block 2 a corresponding fluid duct or aperture 40. These two apertures 38, 40 allow a pressure fluid such as compressed air to flow into or out of the outer cylinder space 4 on each side of the piston-and-cylinder package 6.

The inner cylinder 8 included in the piston-and-cylinder package 6 has a constricted flow passage 42 through its endwall 16 and a corresponding constricted flow passage 44 through the other endwall 28. These two constricted flow passages 42, 44 place the inner cylinder space 46 inside the cylinder 8 in communication with the cylinder space 4 inside the outer cylinder block 2. In case of need, both the outer cylinder block 2 and the inner cylinder 8 may of course have more than one flow aperture or passage through their respective endwalls.

The fact that the flow passages or apertures 42 and 44 through the endwalls 16 and 28 of the inner cylinder 8 are constricted means in this case that they have a minimum flow cross-sectional area which is clearly smaller than the cross-sectional area of the flow apertures or ducts 38 and 40 through the end walls 20 and 22 of the outer cylinder block 2.

We now go on to describe briefly the functioning of the piston-and-cylinder arrangement depicted in FIG. 1.

Subfigure 1a shows the situation when both the piston 10 and the piston-and-cylinder 25 package 6 are at their extreme right-hand position. Compressed air is then introduced via the fluid duct 40 into the outer cylinder space 4 in the outer cylinder block 2, thereby making the piston-and-cylinder package 6 move rapidly to the left and consequently making the piston rod 12 shift to the synchronizing position of the planetary gearing (not depicted here) which is operated by means of the arrangement. This situation is depicted in subfigure 1b. At the same time as the synchronization takes place, compressed air flows via the constricted passage 44 into the inner cylinder 8 so that when the synchronization is complete the piston 10 may move further to the extreme leftward position, which is the situation depicted in subfigure 1c. As the compressed air supply at this stage is via the constricted passage 44, this movement of the piston 10 and hence of the piston rod 12 (which constitutes or is coupled or otherwise connected to the - gearchange shaft) takes place slowly and without risk of the piston 10 causing any disturbing noise when it reaches its extreme position and thereby comes into contact with the endwall 16 of the piston-and-cylinder package 6, which is then already in contact with the endwall 20 of the cylinder block 2.

Subfigures 1d and 1e show analogous movements in the opposite direction (to the right).

The functional principle of the four-stage shift of the piston rod 12 provided by the piston-and-cylinder arrangement according to the invention is as follows.

The four-stage shift arrangement according to the invention (which for the sake of simplicity may also be called the four-position cylinder) is applicable where the speedchange cylinder concerned has at a particular point in its stroke (points A and B in subfigures 1b and 1d respectively) to overcome an extra-large force which has the characteristic of at first halting the movement of the speedchange cylinder before subsequently after a certain time suddenly beginning to decrease in magnitude.

With such a load cycle for the speedchange or shift movement that has to take place, the piston-and-cylinder arrangement according to the invention has the following mode of operation:

In the initial position of the piston-and-cylinder arrangement depicted in FIG. 1 the piston-and-cylinder package 6 is at its extreme right-hand position, as shown in subfigure 1a. Compressed air is thereafter supplied (at L1) to the cylinder space 4 in the outer cylinder block 2, as shown in subfigure 1b. This compressed air supply takes place rapidly. The piston-and-cylinder package 6 then rapidly pushes the outer load (which acts on the piston rod 12) from the minus (−) position towards the plus (+) position (see subfigure 1a). Just before the piston rod 12 reaches the point A, it encounters a force (K) which brings the piston movement to a halt, as shown in subfigure 1b. After certain time this force decreases (when the particular synchronization in the gearbox being operated is complete), thereby allowing the piston movement to continue. This continuing piston movement is mainly brought about by a constricted air supply via a constricted passage 5 44 to the inner cylinder space 46 in the inner cylinder 8 and hence to the piston 10. This constricted air supply is therefore slow, which means that the continuing movement of the piston 10 and the piston rod 12 towards their extreme position (depicted in subfigure 1c) is likewise slow.

The shift movement of the piston rod 12 from the plus (+) position to the minus (−) position (see subfigures 1c–1e) involves a process which is the reverse of the process according to subfigures 1a–1c, with the position A replaced by the position B.

Figure 2:
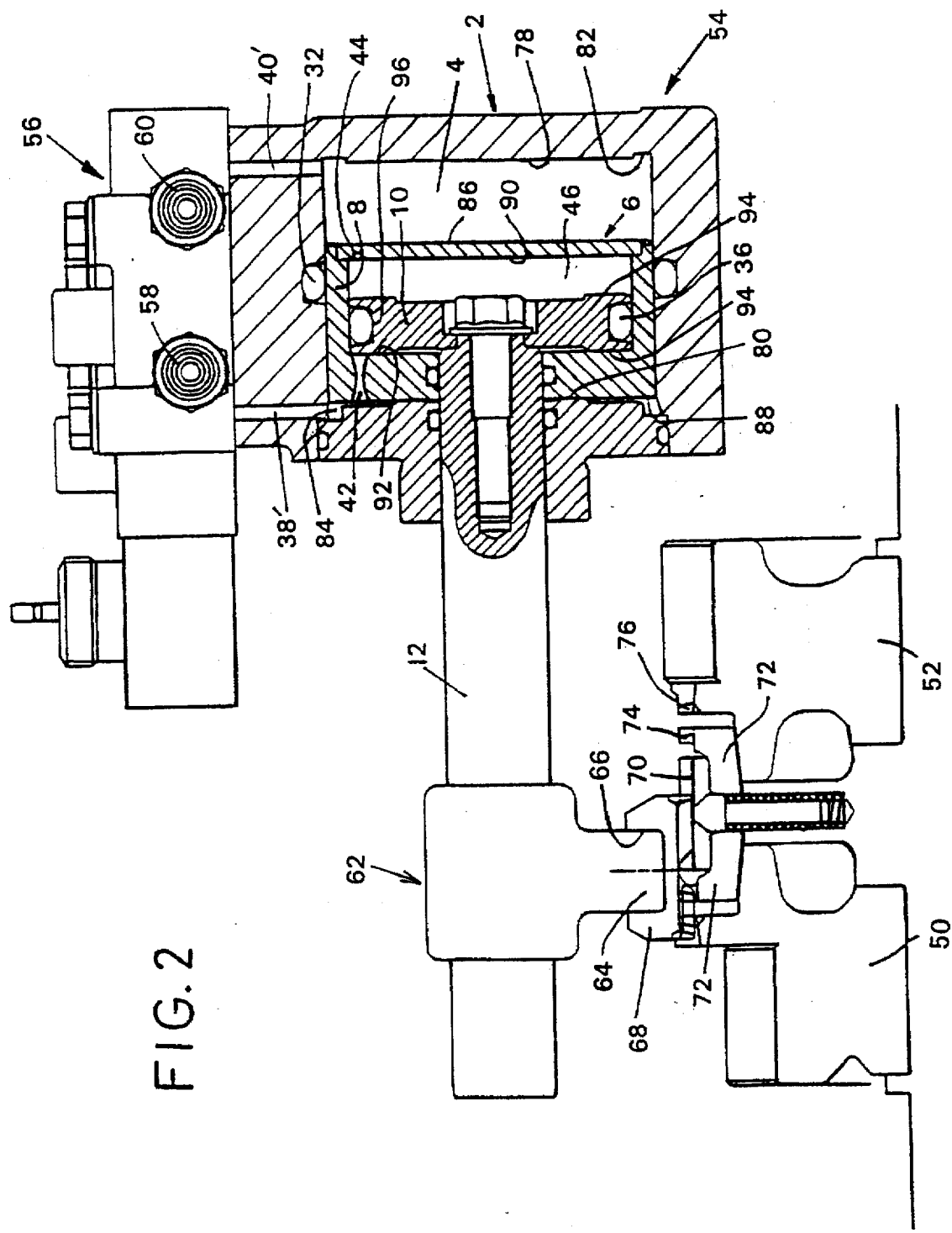

The piston-and-cylinder arrangement according to the invention is also to be exemplified with reference to a specific embodiment of the arrangement, depicted in FIG. 2, whereby it is applied for four-stage shifting of a gears if the shaft for a synchronized gearbox (of which only the two gearwheels 50 and 52 are schematically depicted). In this case the piston rod 12 of the piston-and-cylinder arrangement does itself constitute the gearshift shaft for connecting the relevant gearwheels in the gearbox. FIG. 2 uses the same reference notations as FIG. 1 for the various parts of the arrangement which have direct correspondences with the embodiment according to FIG. 1.

The piston-and-cylinder arrangement 54 shown in FIG. 2 is provided at the top of the drawing with a valve unit 56 with compressed air connections 58 and 60. In this case the piston rod 12 of the piston-and-cylinder arrangement 54 constitutes the gearshift shaft for a gearbox which incorporates the gearwheels 50 and 52. The piston rod 12 has a shift fork 62 fastened to it which by means of the portion 64 engages in an external groove 66 in a clutch socket 68. The axial movement of the clutch socket 68 for speed change of 30 the gearbox is thus brought about by movement of the piston rod 12. The drawing shows the ridged rim portion designated 70 of the carrier in no greater detail, but radially inside this ridged rim portion there are a pair of synchronizing rings 72 arranged conventionally to interact with conical portions of the gearwheels 50 and 52. The teeth of the synchronizing rings are designated 74 and the clutch teeth of the gearwheels are designated 76.

We now go on to describe in more detail the piston-and-cylinder arrangement 54 and particularly those parts of the latter which are not directly indicated by or have no correspondence in the embodiment according to FIG. 1.

As clearly shown in FIG. 2, the outer cylinder space 4 in the outer cylinder block 2 is bounded at its ends by mutually parallel plane endwall surfaces 78 and 80 which are perpendicular to the piston rod 12. At the periphery of each of the endwall surfaces 78 and 80 there are respective circumferential grooves 82 and 84 which communicate with the orifices to the fluid ducts 40' and 38' at the respective ends of the cylinder space 4.

The inner cylinder 8 acting as a piston part has external end surfaces 86 and 88 which are parallel with the respective endwall surfaces 78 and 80 and make good surface contact between the inner cylinder 8 and the endwall surfaces 78 and 80 of the cylinder space 4 possible at the two extreme positions of the piston-and-cylinder package 6 in the cylinder space 4.

The inner cylinder space 46 in the inner cylinder 8 is also bounded at the ends by mutually parallel plane endwall surfaces 90 and 92 which are perpendicular to the piston rod 12. The piston 10 in the inner cylinder 8 has external annular end surface regions 94 which are parallel with these endwall surfaces 90, 92. These surfaces 90, 92 and 94 make good surface contact between the endwall surfaces of the cylinder space 46 and the end surface regions of the piston 10 possible at each extreme position of the piston, which means that the volumes between the piston and the end surface regions may be made small.

Here again the outer cylinder block 2 is provided with a ring seal 32 which seals with respect to the outside of the shell wall 8 of the inner cylinder and which is arranged in a circumferential groove in the shell wall of the cylinder space 4. At the periphery of the piston 10 a circumferential piston seal 36 is arranged in a groove 96 in the shell surface of the piston.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. Apparatus for causing staged movement of a gear change shaft in a synchronized vehicle gearbox, the apparatus comprising:

an outer cylinder having opposite spaced apart first and second end walls and the cylinder extending between the first and second end walls and defining a space in the outer cylinder;

a piston-and-cylinder package in the outer cylinder and shaped for moving through the space in the outer cylinder selectively toward the first or the second end walls; the piston-and-cylinder package comprising:

an outer, first piston in the space in the outer cylinder and movable through the outer cylinder selectively toward one of the first and the second end walls, the first piston defining a space within the first piston which defines a second, inner cylinder having respective opposite spaced apart third and fourth end walls and the inner cylinder defining the space therein extending between the third and fourth end walls; the third end wall of the first piston opposing the first end wall of the outer cylinder and the fourth end wall of the first piston opposing the second end wall of the outer cylinder;

an inner, second piston disposed in and movable through the inner cylinder selectively toward one of the third and fourth end walls;

the gear change shaft being connected with the second inner piston to be moved by movement of the second piston;

a first fluid duct communicating into the outer cylinder between the first and third end walls; a second fluid duct communicating into the outer cylinder between the second and fourth end walls; the first and second fluid ducts being connected for selectively supplying fluid to or removing fluid from the cylinder space inside the outer cylinder;

a third fluid flow passage between the outer and the inner cylinders past the third end wall of the inner cylinder; and a fourth fluid flow passage between the outer and the inner cylinders past the fourth end wall of the inner cylinder.

2. The apparatus of claim 1, wherein the first fluid duct communicates into the space in the outer cylinder at the end region of the outer cylinder toward the first end wall; and the second fluid duct communicates into the space in the outer cylinder at the end region of the outer cylinder toward the second end wall.

3. The apparatus of claim 1, wherein the gear change shaft connected with the inner piston comprises a piston rod extending from the inner piston out of the outer cylinder block for being connected to the gear box to be operated.

4. The apparatus of claim 3, wherein there is an aperture in the third end wall of the inner cylinder through which the piston rod protrudes and a coaxial aperture in the first end wall of the outer cylinder through which the piston rod protrudes externally from the apparatus.

5. The apparatus of claim 1, wherein the third fluid flow passage is through the third end wall of the inner cylinder, and the fourth fluid flow passage is through the fourth end wall of the inner cylinder.

6. The apparatus of claim 5, wherein the third fluid flow passage is shaped and sized to have a smaller flow rate than the first fluid duct; and the fourth fluid flow passage is shaped and sized to have a smaller flow rate of flow than the second fluid duct.

7. The apparatus of claim 5, wherein the third fluid flow passage has a smaller minimum flow cross sectional area than the first fluid duct; and the fourth fluid flow passage has a smaller minimum flow cross sectional area than the second fluid duct.

8. The apparatus of claim 5, wherein the first and second end walls of the outer cylinder include mutually parallel, opposed, planar end wall surfaces that are both oriented perpendicular to the axis of the inner piston; and the third and fourth end walls of the inner cylinder include respective external end surfaces which are parallel with the end wall surfaces of the first and second end walls for making good surface contact possible between the first and third end walls and between the second and fourth end walls at extreme positions of the inner cylinder acting as a piston moving between the first and second end walls of the outer cylinder.

9. The apparatus of claim 8, wherein each of the first and second end walls has a periphery including a circumferential groove and the grooves respectively communicate with the first and second fluid ducts, wherein the grooves are placed to be at the respective opposite ends of the space in the outer cylinder.

10. The apparatus of claim 8, wherein the third and fourth end walls of the inner cylinder have respective opposed inwardly facing end wall surfaces which are mutually parallel and planar and are perpendicular to the axis of the inner piston;

the inner piston in the inner cylinder having opposite external end surface regions oriented parallel with the respective inwardly facing end wall surfaces of the third and fourth end walls at least in the radially outward region of the inner piston for making good surface contact between the inwardly facing end wall surfaces of the inner cylinder and the respective end surface regions of the piston at extreme positions of movement of the piston through the inner cylinder between the third and fourth end walls.

11. The apparatus of claim 5, wherein the third and fourth end walls of the inner cylinder have respective opposed inwardly facing end wall surfaces which are mutually parallel and planar and are perpendicular to the axis of the inner piston;

the inner piston in the inner cylinder having opposite external end surface regions oriented parallel with the respective inwardly facing end wall surfaces of the third and fourth end walls at least in the radially outward region of the inner piston for making good surface contact between the inwardly facing end wall surfaces of the inner cylinder and the respective end surface regions of the piston at extreme positions of movement of the piston through the inner cylinder between the third and fourth end walls.

12. The apparatus of claim 5, wherein the first and second fluid ducts and the third and fourth fluid flow passages comprise ducts for the passage of a gas under pressure and the inner piston and the inner cylinder are selected so that they can be moved by gas pressure applied in the spaces within the cylinders.

13. The apparatus of claim 5, wherein the outer piston includes means enabling it to move sealingly through the outer cylinder, and the inner piston includes means enabling it to move sealingly through the inner cylinder.

14. The apparatus of claim 13, wherein the means of the outer piston enabling it to move sealingly in the outer cylinder comprises a ring seal between the outer cylinder and the exterior of the inner cylinder, and the means of the inner piston enabling it to move sealingly in the inner cylinder comprises the inner piston having a periphery and a circumferential piston seal arranged around the periphery of the inner piston for effecting the seal.

15. The apparatus of claim 13, wherein the outer cylinder includes a circumferential groove in which the ring seal between the outer and inner cylinders is disposed; and the inner piston has a circumferential groove in which the circumferential piston seal is disposed.

16. The apparatus of claim 1, wherein the third fluid flow passage is shaped and sized to have a smaller flow rate than the first fluid duct; and the fourth fluid flow passage is shaped and sized to have a smaller flow rate of flow than the second fluid duct.

17. Apparatus for causing staged movement in changing of gears in a vehicle gear box, the apparatus comprising:

a vehicle gear box including two gears, each gear being selectively engageable;

a gear change shaft movable for causing engagement of a selected of the gears;

apparatus for moving the gear change shaft comprising;

an outer cylinder having opposite spaced apart first and second end walls and the cylinder extending between the first and second end walls and defining a space in the outer cylinder;

a piston-and-cylinder package in the outer cylinder and shaped for moving through the space in the outer cylinder selectively toward the first or the second end walls; the piston-and-cylinder package comprising:

an outer, first piston in the space in the outer cylinder and movable through the outer cylinder selectively toward one of the first and the second end walls, the first piston defining a space within the first piston which defines a second, inner cylinder having respective opposite spaced apart third and fourth end walls and the inner cylinder defining the space therein extending between the third and fourth end walls; the third end wall of the first piston opposing the first end wall of the outer cylinder and the fourth end wall of the first piston opposing the second end wall of the outer cylinder;

an inner, second piston disposed in and movable through the inner cylinder selectively toward one of the third and fourth end walls;

the gear change shaft being connected with the second inner piston to be moved by movement of the second piston;

a first fluid duct communicating into the outer cylinder between the first and third end walls; a second fluid duct communicating into the outer cylinder between the second and fourth end walls; the first and second fluid ducts being connected for selectively supplying fluid to or removing fluid from the cylinder space inside the outer cylinder;

a third fluid flow passage between the outer and the inner cylinders past the third end wall of the inner cylinder; and a fourth fluid flow passage between the outer and the inner cylinders past the fourth end wall of the inner cylinder.

18. The apparatus of claim 17, wherein the gear change shaft connected with the inner piston comprises a piston rod extending from the inner piston out of the outer cylinder block for being connected to the gear box to be operated.

19. The apparatus of claim 17, wherein the third fluid flow passage is shaped and sized to have a smaller flow rate than the first fluid duct; and the fourth fluid flow passage is shaped and sized to have a smaller flow rate of flow than the second fluid duct.

* * * * *